United States Patent

[11] 3,587,216

| [72] | Inventors | Tobias Grether<br>Camarillo;<br>Roger M. Donlon, Oxnard, both of Calif. |
|---|---|---|
| [21] | Appl. No. | 755,099 |
| [22] | Filed | Aug. 26, 1968 |
| [45] | Patented | June 28, 1971 |
| [73] | Assignee | Hi-Gear Harvester Company, Oxnard, Calif. |

[54] CELERY HARVESTER
2 Claims, 7 Drawing Figs.

[52] U.S. Cl................................................. 56/327, 171/61
[51] Int. Cl........................................................ A01d 45/00
[50] Field of Search............................................ 198/198; 56/327, 119, 190, 191, 192; 171/61

[56] References Cited
UNITED STATES PATENTS

| 1,880,324 | 10/1932 | Malcom et al. | 171/34 |
| 2,480,209 | 8/1949 | Aasland | 56/119 |
| 2,522,308 | 9/1950 | Silva | 56/327X |
| 2,624,999 | 1/1953 | Goodnight | 56/25 |
| 2,793,487 | 5/1957 | Wobermin | 56/290X |
| 3,182,808 | 5/1965 | Benoit et al. | 198/198X |
| 3,339,354 | 9/1967 | Kessler | 171/61X |
| 3,420,312 | 1/1969 | Greedy | 171/61 |
| 3,442,071 | 5/1969 | Duda, Jr. | 56/327 |

FOREIGN PATENTS

| 236,846 | 7/1925 | Great Britain | 56/291 |

Primary Examiner—Russell R. Kinsey
Attorney—Allan D. Mockabee

ABSTRACT: A celery or other row crop harvester on a vehicle including a pickup conveyor and a crop cutter wherein the conveyor comprises a pair of endless conveyor elements having facing runs, the conveyor elements including flexible belts each of which comprises a series of bulges away from a conveyor chain, the bulges of one belt being disposed longitudinally between the bulges of the other belt; and conveyor chains on supporting beams, the beams carrying guides for the chains and the beams and guides being provided with wear strip means to hold the chains out of contact with the beams and portions of the guides.

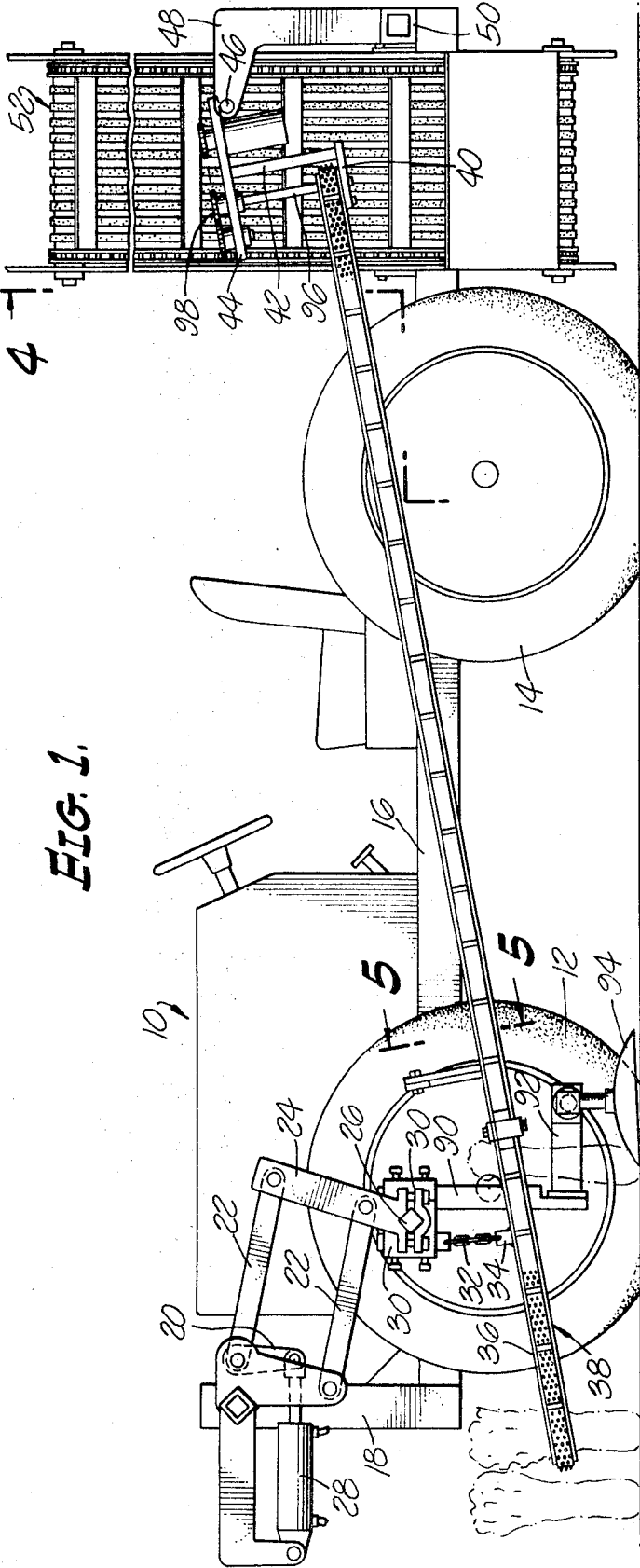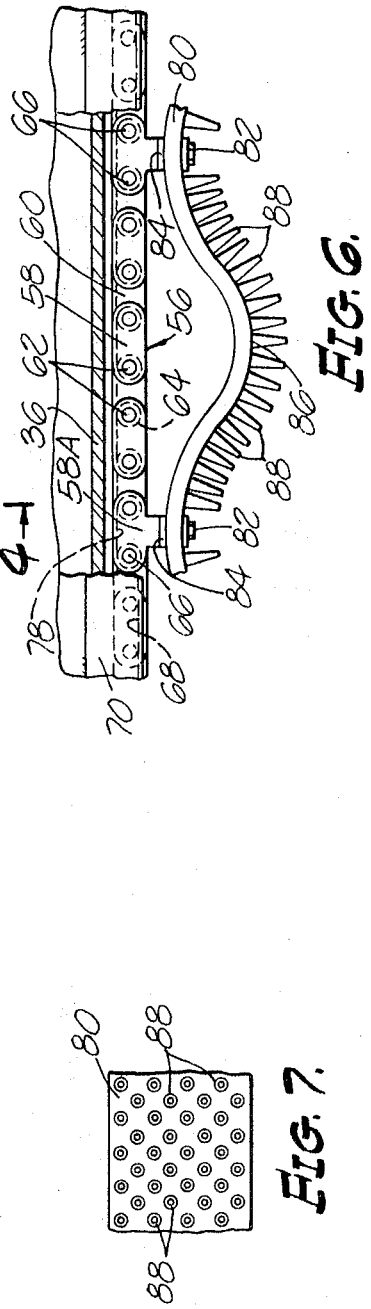

PATENTED JUN 28 1971

INVENTORS.
TOBIAS GRETHER
ROGER M. DONLON
BY
Allan H. Lockabee
ATTORNEY

CELERY HARVESTER

DISCLOSURE

This invention relates to a row drop harvester and is particularly adapted for use in harvesting celery.

One of the principal difficulties encountered in the mechanized harvesting of crops such as celery, is that the pickup mechanism will either not properly grip the stalks and pick them up or will grip them too tightly and injure them. In the case of some row crops stalk damage is of no importance but the celery stalks themselves are the edible portions of the plant, and it is important that they not be crushed or bruised.

It is a general object of the invention to provide a harvester of the type described which includes a pickup conveyor assembly and an associated cutter wherein the conveyor assembly is so constructed that it will grip the stalks sufficiently to properly handle them while at the same time prevent them from injury.

More specifically, it is an object to provide a celery harvester pickup device comprising a pair of endless conveyor elements having facing runs, the conveyor elements including resilient belts secured to a supporting chain at spaced points and having bulges between the spaced points, the bulges being directed toward the facing run of the other conveyor element and providing yielding stalk gripping means.

Another object of the invention is to provide the bulged conveyor belts with resilient flexible stalk engaging fingers which assist in grasping the celery stalks firmly without damage.

Still a further object of the invention is to provide conveyor elements including endless chains supported in such a manner that the supporting structure for the chains is subjected to a minimum of wear.

The above and other objects and advantages of the invention will more fully appear from the following description made in connection with the accompanying drawings, in which:

FIG. 1 is a side elevational view of an embodiment of the invention;

FIG. 6 is a detail, partially in section taken approximately on the line 6-6 of FIG. 5;

FIG. 7 is a plan view of a portion of one of the flexible conveyor belts.

Figure 2:
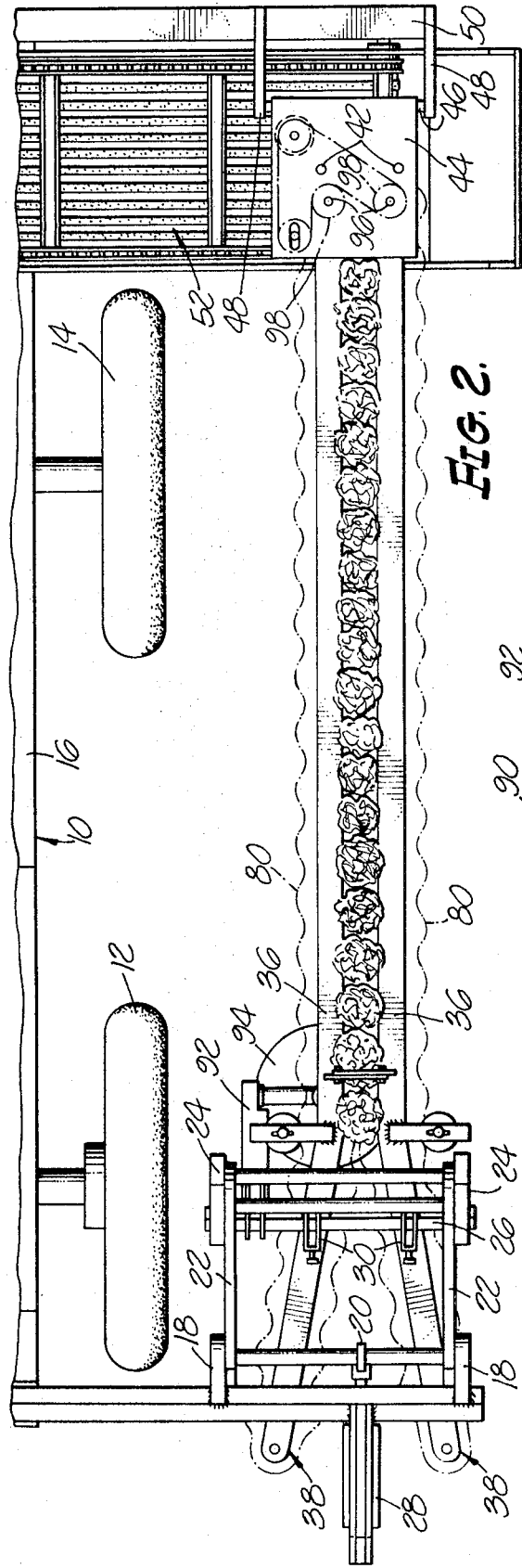
FIG. 2 is a top plan view thereof.

In FIG. 1 there is shown a tractor generally indicated at 10 and provided with the usual front wheels 12 and and rear wheels 14. Extending across the front of a pair of tractor frame members 16 is a supporting structure 18 which in a conventional manner supports a bell crank 20, parallelogram arms 22 and a connecting link 24, the lower end of which carries an implement bar 26. The parallelogram arrangement with the bell crank 20 and connecting lever 24 is duplicated as indicated in FIG. 2, and is a conventional type of vertically adjustable implement support which may be actuated by a piston and cylinder unit 28 under hydraulic pressure from a suitable pump driven by the tractor. The implement bar 26 is provided with releasable clamps 30 which can be moved longitudinally on bar 26 or in other words, laterally with respect to the tractor. Each clamp 30 has a chain 32 connected thereto and to a lug 34 on a conveyor supporting beam 36, the chain 32 being adapted to support the forward portion of a pair of pickup conveyor assemblies indicated generally at 38. The rear ends of the conveyor assemblies 38 are supported by a plate 40 suspended by rods 42 from an upper plate 44, said upper plate being welded or otherwise suitably secured to a cross bar 46 between a pair of uprights 48 whose lower ends are secured to a cross frame member 50 welded to the tractor frame 16.

At the rear portion of the tractor an elevating conveyor generally indicated at 52 is secured to the tractor frame 16 by brackets 54, the lower end of the elevating conveyor 52 being disposed beneath the rear end of the conveyor assemblies 38. The elevating conveyor may be of any suitable construction.

Figure 4:
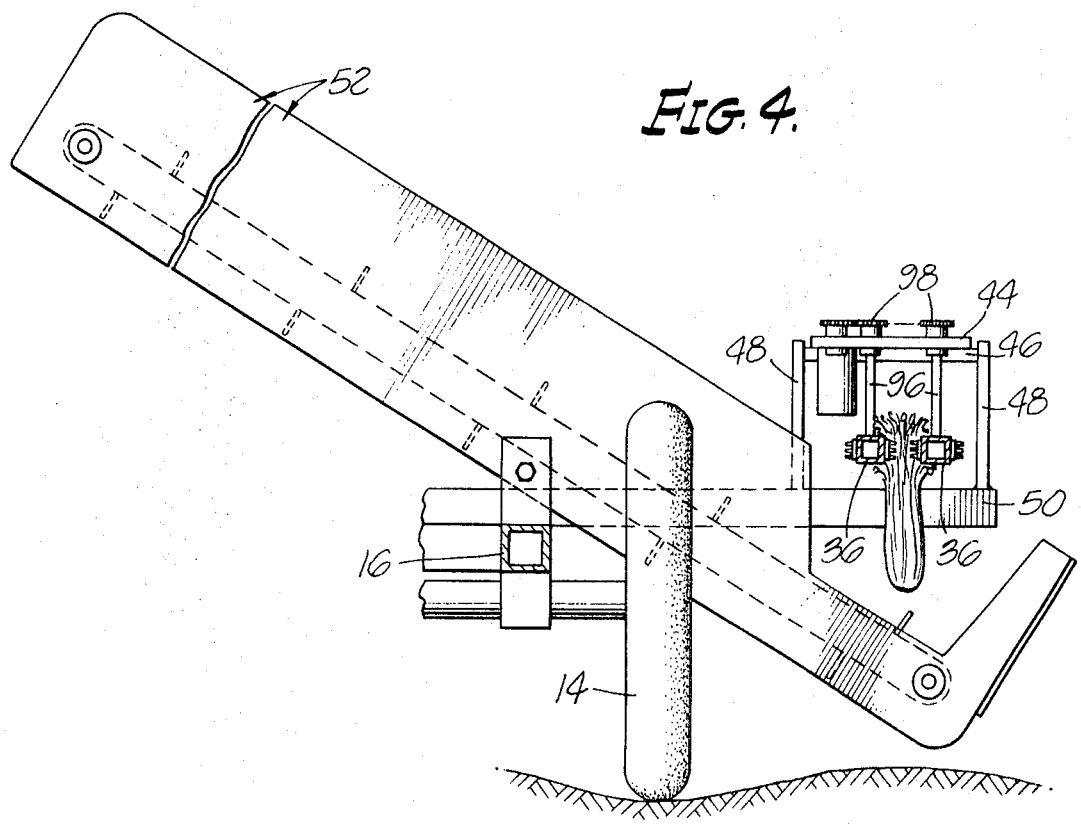
FIG. 4 is a sectional view taken approximately on the line 4-4 of FIG. 1.
Figure 5:
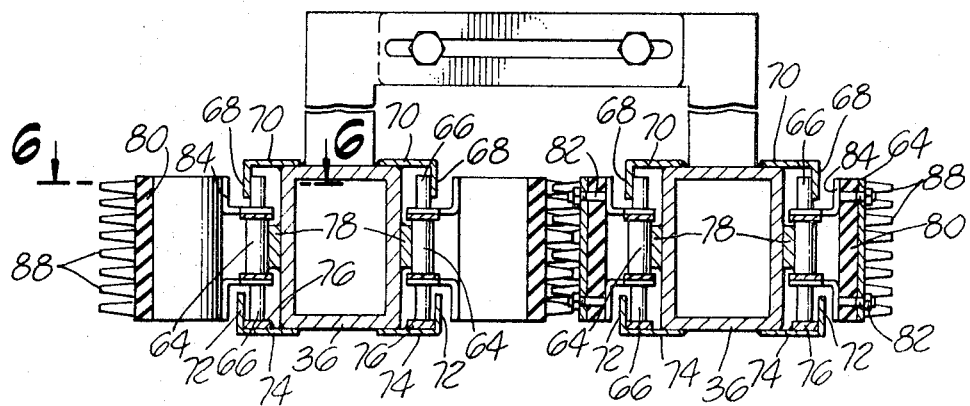
FIG. 5 is an enlarged sectional view taken approximately on the line 5-5 of FIG. 1.

Each of the conveyor assemblies 38 comprises a conveyor chain 56 made up of links 58 and 60, the adjacent ends of which are connected by link pins 62, and as shown in FIG. 5, about each link pin is a roller 64. At spaced points along the conveyor chain 56 there are provided elongated link pins 66, the intervening pins being substantially no longer than the transverse extent of the conveyor chain. The upper ends of the elongated link pins 66 extend upwardly behind the downwardly directed flange 68 of a chain guide 70 which is welded or otherwise suitably secured to the conveyor beam 36. The lower ends of said elongated link pins 66 extend downwardly behind the upwardly disposed flange 72 of a chain guide 74 which likewise is welded to the conveyor supporting beam 36. The lower chain guide 74 has a wear strip 76 against which the lower ends of the elongated links 66 bear and the beams 36 have combined spacers and wear strips 78 secured thereto. The wear strips 78 are engaged by the rollers 64 forming portions of the conveyor chain links. Thus wear resulting from movement of the conveyor chains is taken up by the wear strips 76 and 78 and the conveyor supporting beams 36 are relieved of damage due to wear.

Extending along the outer sides of each conveyor chain 56 is a flexible belt 80 secured by nutted bolts 82 to angle brackets 84 which extend from and preferably are integrally formed with certain of the conveyor chain links 58, one such link being indicated at 58A in FIG. 6.

Figure 3:
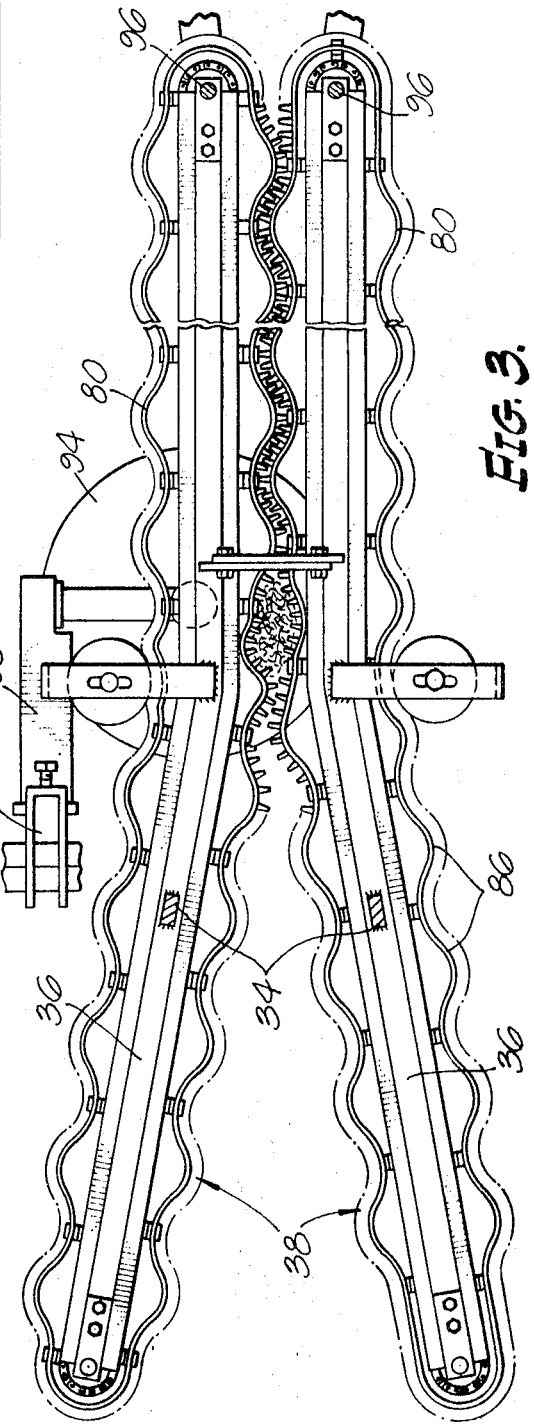
FIG. 3 is an enlarged top plan view of the conveyor construction.

It should be noted that the flexible belts 80 are secured to their respective conveyor chains in such a manner that between adjacent pairs of belt connecting brackets 84, the belt 80 is bulged outwardly as at 86, and as shown in FIG. 3 the bulges of one conveyor belt are staggered relative to the bulges of the adjacent conveyor belt so that together they have a sinuous conformation. Thus, opposite the anchoring brackets for one conveyor belt, the other conveyor belt is bulged outwardly.

As shown in FIG. 3, the conveyor assemblies 38 at their forward portions diverge forwardly to provide a mouth into which the row crop feeds and from their point of convergence rearwardly the conveyor assemblies are parallel and the conveyor belts are closely spaced along generally vertical planes with the faces of the conveyor belts disposed toward each other.

Each conveyor belt has its facing portion provided with rubber or other suitably resilient prongs or teeth 88 and the belts are sufficiently closely positioned that the teeth or prongs 88 on one belt will be closely spaced or may intermesh with those of the other.

Suitably supported from the implement bar 26 by means of brackets 90 and 92 is a disc cutter 94 which, as shown in FIG. 3, lies approximately at the bight formed by the convergence of the forward portion of the conveyor assemblies. This cutter is not shown in any great detail because it is convention in many types of harvesters.

When the tractor is driven along a row of celery, for example, it can be steered so that the row of stalks will feed in between the conveyor assemblies 38 and where they converge the stalks will be gripped by the opposite or facing conveyor belt 80, and as they are gripped, the stalks will be cut by the cutter 94. As illustrated in FIG. 3, the flexible conveyor belts 80 with their bulges 86 and their flexible and resilient teeth 88, can firmly grip the stalks for cutting and conveying rearwardly to the elevating conveyor 52 without damage to the edible stalks. FIG. 3 shows the manner in which the conveyor belts can be distorted from their regular wave form or shape to accommodate stalks of different thickness and different cross-sectional shapes.

The forwardly divergent forward ends of the conveyor assemblies render it easy to follow row crop and the rearward and upward incline of the conveyor assemblies, as shown in FIG. 1, not only permits the gripping of stalks of different heights adjacent the forward end of the conveyor, but also elevates the stalks to the rearward end so they will be deposited on the lower portion of the elevated conveyor 52.

The conveyor assemblies may be conveniently driven by drive shafts 96 suitably geared to the conveyor chains at their lower ends and provided with sprockets 98 which can be connected to the tractor power mechanism in any suitable manner not shown.

From the foregoing it will be seen that I have provided a celery harvester with a pickup conveyor assembly which will efficiently grip and transport the stalks after they are cut wherein the flexible conveyor belt and its flexible and yielding teeth will accommodate different sizes and shapes of stalks and handle them efficiently without bruising or other damage. Furthermore, the conveyor chains are so constructed and mounted that there is a minumum of frictional drag and a minimum of wear against guides and wear plates or strips which can be replaced if necessary at a minimum cost.

It should of course be understood that various changes can be made in the form, shape and details of the structure, without departing from the spirit of the invention.

We claim:

1. A celery harvester and the like comprising a vehicle with a powered pickup conveyor and an associated cutter supported by the vehicle, wherein the improvement comprises: said pickup conveyor comprising a pair of endless flexible members in elongated loops extending generally longitudinally of the direction of movement of the vehicle and having runs in generally parallel spaced relation at their intermediate and rear portions, the forward portions being divergent forwardly, said cutter being located below the conveyor members adjacent the bight defined by their point of divergence, at least one of said endless flexible members being driven, backing means restraining said parallel runs against movement away from each other, flexible undulated belts carried by said endless flexible members having valley portions secured to said flexible members and crests curved away from the endless flexible members, and said belts having resilient crop-gripping fingers thereon projecting toward the other belt, the crests of said belts being yieldable toward their respective endless flexible members.

2. The structure in claim 1, and the amount of yieldability of the crests being greater than the lengths of said resilient crop-gripping fingers.